United States Patent [19]
Walker et al.

[11] 3,952,848
[45] Apr. 27, 1976

[54] SECTION INSULATORS OF ELECTRIC TRACTION SYSTEMS

[75] Inventors: Wilfred Arthur Walker, Harrow; Joseph Littler, Huyton, both of England

[73] Assignee: BICC Limited, London, England

[22] Filed: May 8, 1974

[21] Appl. No.: 467,956

Related U.S. Application Data
[62] Division of Ser. No. 236,412, March 20, 1972, abandoned.

[30] Foreign Application Priority Data
Mar. 24, 1971 United Kingdom............... 7697/71

[52] U.S. Cl. ............................. 191/33 R; 174/179; 191/39; 428/388; 428/415; 428/417; 428/422
[51] Int. Cl.² .................... B60M 5/00; B32B 27/38; B32B 17/04
[58] Field of Search............. 191/39, 33 R; 174/179; 428/297, 415, 417, 422, 388; 161/168

[56] References Cited
UNITED STATES PATENTS

| | | | |
|---|---|---|---|
| 2,001,357 | 5/1935 | Guignard | 191/33 R |
| 3,291,899 | 12/1966 | Ward et al. | 174/137 B |
| 3,467,596 | 9/1969 | Hermann | 252/12 |
| 3,624,318 | 11/1971 | Rekers | 191/23 A |
| 3,760,913 | 9/1973 | Payen | 191/29 R X |
| 3,786,762 | 1/1974 | Corkum et al. | 191/29 R X |

FOREIGN PATENTS OR APPLICATIONS

| | | | |
|---|---|---|---|
| 928,914 | 3/1960 | United Kingdom | 191/39 |
| 904,944 | 9/1962 | United Kingdom | 191/39 |
| 920,289 | 3/1963 | United Kingdom | 191/39 |
| 902,409 | 8/1962 | United Kingdom | 191/39 |
| 1,008,268 | 10/1965 | United Kingdom | |
| 983,526 | 2/1965 | United Kingdom | |
| 1,233,310 | 5/1971 | United Kingdom | 174/179 |
| 1,133,006 | 11/1968 | United Kingdom | 174/179 |
| 915,052 | 1/1963 | United Kingdom | 174/179 |

*Primary Examiner*—Harold Ansher
*Attorney, Agent, or Firm*—Buell, Blenko, and Ziesenheim

[57] ABSTRACT

An electric insulator used as a section insulator directly inserted in an overhead contact wire comprises an elongate body of synthetic resin which is reinforced with glass fibres or other fibres of high tensile strength, and has substantially the whole of its exposed surface formed of one or more than one composition based on a cycloaliphatic resin cured with an acidic curing agent. At least one exposed resin surface (the running surface) that is continuous from end to end over at least a major portion of the length of the body is formed by a composition comprising the cured reaction product of 100 parts of a cycloaliphatic epoxy resin, 40–250 parts of an acidic hardener therefor and an effective amount of an accelerator and, dispersed in the said reaction product 50–400 parts of a mineral filler substantially wholly in the form of particles not greater in any dimension than 80 micrometers and 10–100 parts of a low-friction fluorocarbon polymer.

12 Claims, 9 Drawing Figures

U.S. Patent April 27, 1976 3,952,848
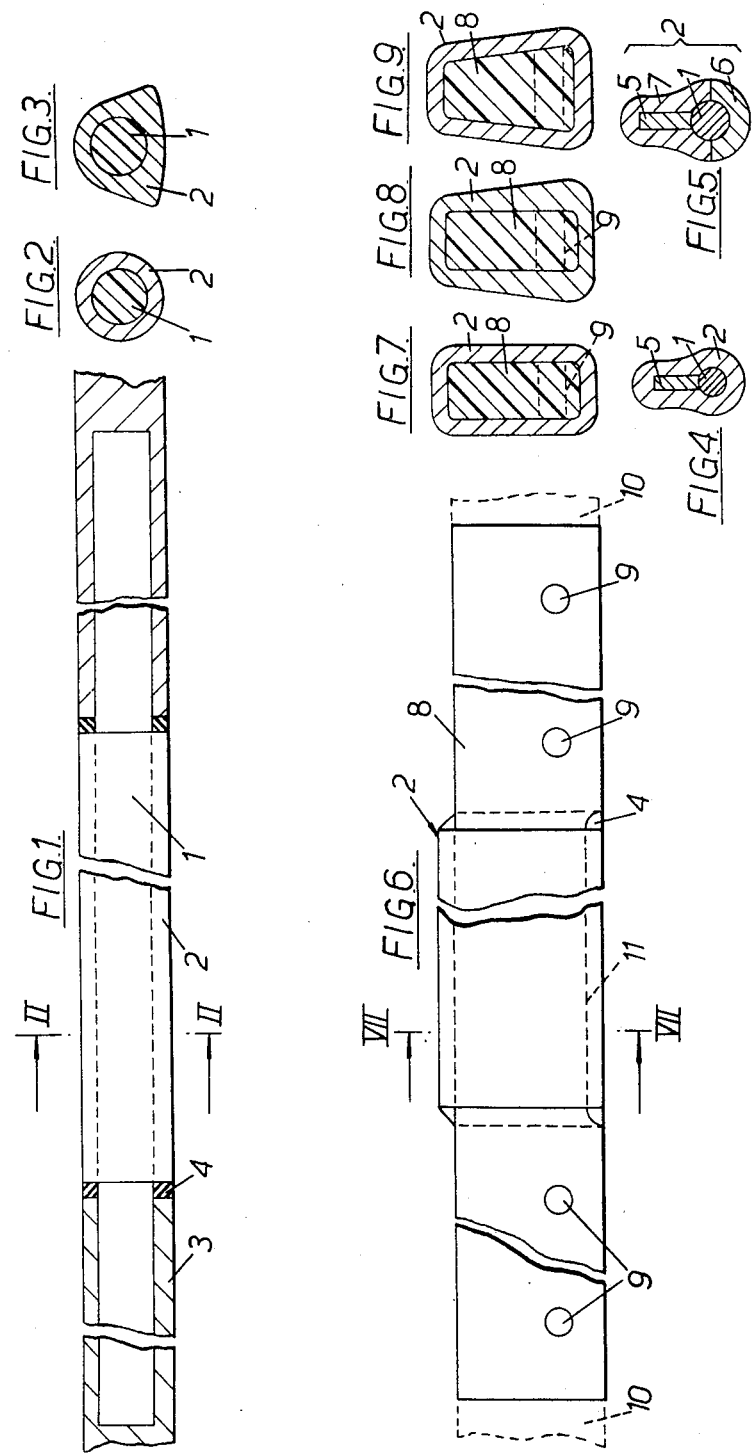

SECTION INSULATORS OF ELECTRIC TRACTION SYSTEMS

This is a division of application Ser. No. 236,412, filed Mar. 20, 1972, now abandoned.

This invention relates to electric insulators and more particularly to insulators which are suitable for use as insulating runners forming the whole or part of a section insulator in the overhead conductor of an electric traction system. It also relates to systems in which they are used. In a high-speed system, it is desirable for the mechanical properties (especially the mass per unit length, the displacement of the flexural neutral axis from the running surface, and the flexural modulus) to be as nearly as possible identical with those of the adjacent conductors.

A major advance in this direction was made by the introduction of the insulating runner in accordance with British Pat. No. 983526, which can be inserted directly in the overhead contact wire and across which the pantograph or other current collector may run. In the form mainly used, that runner includes a rod of resin-bonded glass fibre with metallic end fittings compression jointed to it; to avoid "tracking" when exposed to atmospheric contamination the part of the rod between the end fittings is enclosed in a watertight covering built up of short tubular ceramic (or vitreous) bodies threaded on the rod and spaced from one another by resilient washers. The major part of each tubular body constitutes a portion of the effective running surface, but the ends of each tubular body are tapered to avoid presenting a sharp corner on which the current collector might strike.

It will be appreciated that this form of waterproof covering limits the flexibility of the runner and fixes its neutral axis substantially at its geometrical axis, and that its effectiveness depends upon the integrity of the seal formed between adjacent tubular bodies by the washers.

The present invention is based upon the discovery of certain synthetic resin compositions that have a sufficiently good combination of resistance to tracking and to abrasion to allow the elimination of the ceramic or vitreous bodies.

In accordance with the invention, an electric insulator comprises an elongate body of synthetic resin, reinforced with glass fibres or other fibres of high tensile strength, having substantially the whole of its exposed surface formed of one or more than one composition based on a cycloaliphatic resin cured with an acidic curing agent and having at least one exposed resin surface (the running surface) that is continuous from end to end over at least a major portion of the length of the body and is formed by a composition comprising the cured reaction product (known per se) of 100 parts of a cycloaliphatic epoxy resin, 40 – 250 parts of an acidic hardener therefor and an effective amount of an accelerator and, dispersed in the said reaction product 50 – 400 parts of a mineral filler substantially wholly in the form of particles not greater in any dimension than 80 micrometers and 10 – 100 parts of a low-friction fluorocarbon polymer. (All parts herein are by weight).

Preferably the synthetic resin body is reinforced by a preformed resin-bonded glass fibre rod, or if desired more than one such rod, and metallic end-fittings can be secured to the ends of this rod or rods. Provided that the or each rod is substantially completely enclosed, bonding resins that are not resistant to tracking can be used.

Preferably substantially the whole of the resin body except for the resin-bonded glass fibre rod or other fibrous reinforcement has the composition specified for the running surface and preferably the resin body is directly vacuum-cast upon the resin-bonded glass fibre rod or other reinforcement; however, there is a tendency in casting such resin compositions to form a thin surface layer that is 'resin-rich' that is deficient in dispersed particles: this layer must be removed from the running surface (preferably by abrasion) to obtain the benefits of the invention, but it can be left on other parts of the surface. Metallic end-fittings are preferably secured to the insulator after the casting step, but where a preformed resin-bonded fibre rod is used they may alternatively be fixed to that rod in a preliminary step. To avoid local over-stressing of the cast resin body, it may be necessary to provide an elastomeric material between the end-fittings and the cast resin.

By an "acidic hardener" is meant a hardener that is either a dicarboxylic or polycarboxylic acid or an anhydride of such an acid.

It has been found that it is often beneficial to include in the hardener at least a small proportion, say about 5 parts per hundred parts of the epoxy resin, of an anhydride of an acid having a functionality of at least three, for example polyazelaic polyanhydride or the Diels-Alder adducts of formula

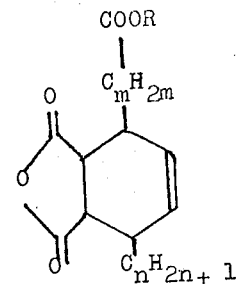

where R is H or methyl, $m$ is 6 or 7 and $n$ is 5 or 6. This appears to facilitate the formation of a stable dispersion that does not settle out or flocculate during curing.

The accelerator used may be of the amine type or the polyol type but stannous octoate is preferred. The quantity of accelerator needed naturally varies with the specific accelerator used but ordinarily it will be in the range 0.05 – 1 part per hundred parts of the cycloaliphatic epoxy resin.

The particle size of the filler is preferably not greater than 50 micrometers and more especially it is preferred that a fairly wide range of particle sizes should be present with a maximum of about 50 micrometers and a high proportion much smaller. The type of mineral filler that should be used depends upon the relative importance of abrasion resistance and tracking properties (which itself depends on atmospheric conditions) but in general it is very desirable that the hardness of the filler should be approximately equal to that of the pick-up material to be used in the system.

Preferably the hardnesses of the two materials should not differ by more than 3 on Moh's hardness scale, for example if carbon pick-up shoes having a hardness of around 4.8 are used the filler should have a hardness in the approximate range 1.8 – 7.8. Examples of suitable fillers include quartz flour or other silica flour (up to 7.0) calcite (3) Gibbsite, $Al_2O_3 - 3H_2O$ (2.5 – 3.5), harder grades of Bauxite (up to 3), insulating grade clays (2 – 2.5) and Periclase, MgO(5.5–6). If the filler is too hard there is a danger of building up a coating of carbon or other pick-up material on the running surface.

The low-friction fluorocarbon polymer is preferably polytetrafluoroethylene (PTFE), and a fine dispersion grade is especially preferred.

A preferred composition for the resin composition forming the exposed surface of a section insulator for use in a system having carbon pick-up shoes comprises: 100 parts of the cycloaliphatic resin sold under the designation ERL - 4289 (which is manufactured by Union Carbide Corpn. and is sold in the United Kingdom by Bakelite Xylonite Ltd which has the formula

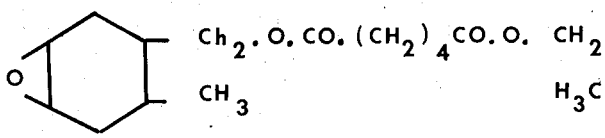 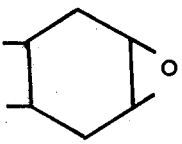

35 parts of hexahydrophthalic anhydride,
5 parts of a mixture of the Diels-Alder adducts referred to above (in which R is H),
½ part of stannous octoate,
100 parts of silica flour having the particle size distribution indicated above, and
5 parts of the dispersion grade PTFE powder sold under the trade mark "Teflon" as Teflon TE 701 N.

The invention will be further described, by way of example, with reference to the accompanying drawings wherein:

FIG. 1 is a partly-sectioned side elevation of one type of section insulator in accordance with the invention;

FIGS. 2 and 3 are alternative cross-sections on the line II — II in FIG. 1;

FIGS. 4 and 5 are cross-sections, similar to FIGS. 2 and 3, showing modifications;

FIG. 6 is a side elevation of another type of section-insulator in accordance with the invention; and FIGS. 7, 8 and 9 are alternative cross-sections on the line VII — VII in FIG. 6

The insulators illustrated by FIGS. 1 – 3 comprise a resin-bonded glass fibre rod 1 a central part of which, constituting the major part of its length, is embedded in a body 2 vacuum-cast from the preferred composition specified above. Metal end-fittings 3 are compression-jointed to the ends of the rod 1 and are slightly spaced from the ends of the resin body 2 to leave a gap which is filled with a silicone rubber composition 4. For a typical section-insulator a gap of about 1.5 mm has been found sufficient to substantially eliminate the risk of cracks developing at the ends of the resin body 2 when the insulator is flexed in service.

The simple circular-cross-section shown in FIG. 2 is easier and cheaper to manufacture than the alternative shown in FIG. 3, but the latter gives the insulator a longer service life owing to the greater area of the running surface.

Resin-bonded glass-fibre rods of small diameter tend to be very flexible, and this can cause difficulties in moulding a thin shell to surround a considerable length of such a rod. This difficulty can be reduced to some extent by gluing to the rod a web 5 of resin-bonded fibre glass as shown in FIG. 4. This also makes it easier to form an insulator with flexural characteristics similar to those of the contact-wire in which it is to be inserted. The web 5 may be terminated just short of the end-fittings.

FIG. 5 shows a further modification in which the resin body 2 is formed in two parts 6,7. This permits the reinforcing rod 1 (and web 5) to be positively supported throughout casting and has the additional advantage that the upper part 7 of the cast resin body may be formed of a conventional tracking-resistant cycloaliphatic resin composition, so reducing the quantity of the more expensive fillers required. Preferably the lower part 6, which constitutes the running surface and will generally be harder than the upper part 7, is cast first.

In the alternative construction illustrated by FIGS. 6–9 the resin-bonded glass fibre rod (1) is replaced by a bar 8 having holes 9 to receive rivets, pins etc, to secure end-fittings 10 (shown in dotted lines) with or without the use of glue. The holes 9 should be placed with their axes in the plane containing the flexural neutral axis of the insulator. The bar may be waisted as shown at 11 so that the resin body 2 may be cast about it to form a smooth running surface. Again silicone rubber or other elastomeric material 4 is inserted between the cast resin body and the metallic fittings to avoid the risk of cracking.

FIG. 7 shows a simple rectangular cross-section, and FIGS. 8 and 9 show alternative ways of increasing the area of the running surface.

What we claim as our invention is:

1. A section insulator adapted to be inserted directly in a contact wire in an electric traction system having at least one vehicle constrained to move in at least one predetermined path and having a pick-up shoe, and at least one contact wire for supplying electric current to the said shoe comprising an elongate body of synthetic resin, reinforced with glass fibres or other fibres of high tensile strength, the improvement whereby substantially the whole of the exposed surface of said insulator is formed of a composition based on a cycloaliphatic epoxy resin cured with an acidic curing agent and having a running surface for engagement with said shoe that is continuous from end to end over at least a major portion of the length of the body and is formed by a composition comprising the cured reaction product of 100 parts of a cycloaliphatic epoxy resin, 40 – 250 parts of an acidic hardener therefor and an effective amount of an accelerator, and dispersed in the said reaction product 50 – 400 parts of a mineral filler substantially wholly in the form of particles not greater in any dimension than 80 micrometers and 10–100 parts of a low-friction fluorocarbon polymer.

2. A system as claimed in claim 1 in which the said mineral filler has a maximum particle size not greater than 50 micrometers.

3. A system as claimed in claim 1 in which said fluorocarbon polymer is polytetrafluoroethylene.

4. A system as claimed in claim 3 in which said polytetrafluoroethylene is a fine dispersion grade.

5. A system as claimed in claim 1 in which the said acidic hardener is an anhydride of a carboxylic acid having a functionality of at least 2.

6. A system as claimed in claim 5 in which said hardener comprises at least 5 parts per hundred parts of epoxy resin of an anhydride of an acid having a functionality of at least 3.

7. A system as claimed in claim 6 in which said anhydride is polyazelaic polyanhydride.

8. A system as claimed in claim 6 in which the said anhydride is a Diels-Alder adduct of formula

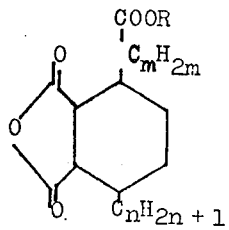

where R is selected from the group consisting of H and methyl, $m$ is an integer not less than 6 and not greater than 7 and $n$ is an integer not less than 5 and not greater than 6.

9. A system as claimed in claim 1 in which, apart from the fibrous reinforcement, the whole of the resin body has the composition specified.

10. A system as claimed in claim 1 wherein said cured reaction product is the reaction product of 100 parts of the cycloaliphatic resin having the formula

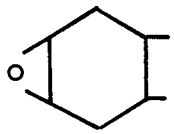 

35 parts of hexahydrophthalic anhydride 5 parts of a mixture of a Diels-Alder adduct of formula

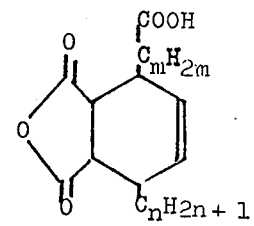

where $n = 6$ and $m = 6$ with another Diels-Alder adduct of the same formula where the sum of $m$ and $n$ is 12 and $m$ is an integer lying between 5.5 and 7.5.

½ part stannous octoate 100 parts silica flour having a maximum particle size of 50 micrometers, and 5 parts dispersion grade polytetrafluoroethylene powder.

11. A system in accordance with claim 1 wherein said shoe is of carbon and said mineral filler has a Moh's hardness in the range 1.8 to 7.8.

12. A system as claimed in claim 11 in which the said mineral filler is selected from the group consisting of silica flour, calcite, Gibbsite, Periclase insulating grades of clay, and grades of Bauxite having a Moh's hardness of at least 1.8.

* * * * *